(12) United States Patent
Lecinq et al.

(10) Patent No.: US 7,267,507 B2
(45) Date of Patent: Sep. 11, 2007

(54) METHOD OF REINFORCING AN EMBEDDED CYLINDRICAL PIPE

(75) Inventors: Benoît Lecinq, Fontenay-Aux-Roses (FR); Jérôme Stubler, Paris (FR); Christian Tourneur, Le Mesnil Saint Denis (FR); Ivica Zivanovic, Arnouville les Gonesse (FR)

(73) Assignee: Freyssinet International (STUP) (FR)

( * ) Notice: Subject to any disclaimer, the term of this patent is extended or adjusted under 35 U.S.C. 154(b) by 129 days.

(21) Appl. No.: 11/120,806

(22) Filed: May 3, 2005

(65) Prior Publication Data

US 2005/0246995 A1 Nov. 10, 2005

(30) Foreign Application Priority Data

May 5, 2004 (FR) ................... 04 04833

(51) Int. Cl.
*F16L 55/18* (2006.01)
(52) U.S. Cl. ................ 405/184.4; 405/184.1; 138/97
(58) Field of Classification Search ............ 405/184.2, 405/184.1; 138/97, 98
See application file for complete search history.

(56) References Cited

U.S. PATENT DOCUMENTS

| 3,340,115 | A | | 9/1967 | Rubenstein |
| 3,742,985 | A | | 7/1973 | Rubenstein |
| 3,950,465 | A | | 4/1976 | Farahar |
| 5,101,863 | A | * | 4/1992 | Fujii et al. ............... 138/98 |
| 5,145,281 | A | * | 9/1992 | Molyneux ............ 405/184.2 |
| 5,388,929 | A | | 2/1995 | Molyneux |
| 5,395,472 | A | * | 3/1995 | Mandich .................. 138/97 |
| 5,580,406 | A | * | 12/1996 | O'ffill .................... 138/98 |
| 5,725,328 | A | * | 3/1998 | Schmager ............... 405/151 |
| 5,762,450 | A | * | 6/1998 | Schmager ............ 405/184.2 |
| 5,915,886 | A | * | 6/1999 | McNeil ............... 405/184.2 |
| 6,167,913 | B1 | * | 1/2001 | Wood et al. .............. 138/98 |
| 6,602,025 | B2 | * | 8/2003 | Markusch et al. ...... 405/184.2 |
| 2003/0178201 | A1 | * | 9/2003 | Gleim et al. ........... 405/184.2 |
| 2004/0231740 | A1 | | 11/2004 | Stubler |

FOREIGN PATENT DOCUMENTS

| DE | 36 16 445 | 8/1987 |
| EP | 0 837 201 | 4/1998 |
| GB | 1 288 284 | 11/1969 |
| WO | WO98/09042 | 3/1998 |
| WO | WO 03/014614 | 2/2003 |

* cited by examiner

*Primary Examiner*—Frederick L. Lagman
(74) *Attorney, Agent, or Firm*—Banner & Witcoff, Ltd.

(57) ABSTRACT

A composite structural reinforcement is realized within the pipe through in situ stratification of at least one band of reinforcement fibers and a resin matrix. The band is arranged according to a helicoidal path along the internal side of the pipe.

21 Claims, 1 Drawing Sheet

METHOD OF REINFORCING AN EMBEDDED CYLINDRICAL PIPE

CROSS-REFERENCE TO RELATED APPLICATION

This is a convention utility application derived from and corresponding to French Patent Application Serial No. 04 04833 filed May 5, 2004 having the same title, incorporated herewith by reference and for which priority is claimed.

BACKGROUND OF THE INVENTION

In a principal aspect the present invention relates to a methods of reinforcing pipes and in particular repairing embedded pipes.

These pipes belong for example to a water delivery network. In their most common form these pipes are constituted by an end to end assembly of segments of pipe made from pre-stressed concrete and having a relatively large diameter of typically 0.5 m to 6 m environ. Water flows through said pipes under a pressure of up to around twenty bars. These segments of concrete pipe can incorporate an interior metal cylinder (liner). The latter is not designed, however, to carry the stress in terms of pressure due to the fluid flowing through. This stress is carried by passive armatures (pre-fabricated cylindrical armature cage or by the pre-stressing of the concrete. The latter is realized by means of threads wound in a spiral outside of the concrete core of the pipe segment. During manufacture of this segment its concrete core is rotated about its axis to receive the thread which is checked in order to be brought under pressure. This thread is then protected against corrosion by projecting a supplementary layer of concrete or mortar over twenty to thirty millimeters.

FIG. 1 shows the structure of a pre-stressed concrete pipe as used in many water delivery networks. The wall of the pipe comprises:
- a concrete core 11 incorporating a watertight liner 12 constituted by a ductile cylinder made from thin steel (so-called embedded-cylinder pipe). The concrete of the core 11 is distributed between an internal layer 13 of a few centimeters in thickness which is situated on the internal side of the pipe and a thicker external layer 14 which in most cases is not reinforced;
- pre-stressing threads wound in one or two layers around the concrete core;
- protective anti-corrosion mortar 16 surrounding the threads 15 in order to passivate them;
- an optional paint or resin 17 improving the anti-corrosion protection.

Pipes of this type are most frequently embedded. They are exposed to a risk of corrosion according to the aggressiveness of the environment. The most common form of degradation occurs as follows:
- migration of aggressive ions across the protective mortar 16;
- corrosion of the pre-stressing threads 15;
- breaking of the pre-stressing threads and local delamination;
- general delamination of the external mortar 16;
- depassivation of the threads and acceleration of corrosion.

The process can then accelerate and lead to the breaking of the pipe. Methods of magnetic or acoustic detection allow breaks in thread to be located and the state of the pipe to be assessed. Depending upon the assessed state a decision to repair can be taken.

Repair is generally carried out from the exterior. New armatures, passive or pre-stressed, are placed around the pipe in order to collar it. See for example international patent application published as WO 03/014614.

Repairs can also be carried out from the inside by incorporating within the pipe a resistant core for the purpose of re-establishing the resistance lost through the breaking of the pre-stressing threads. Repairs carried out from the inside are generally more expensive. Such repairs are carried out when the excavation works are impossible or difficult.

Repairs from the inside generally consist in placing a metal liner within the pipe. The interstice between the new resistant liner and the pipe is filled with grout. One difficulty is that a local error in realization can lead to infiltrations of water in the injected interstice. This water penetration can cause the concrete core of the pipe to be brought under pressure and can make the new resistant liner inefficient. This will result in a risk of a break in the pipe outside of the new liner.

When repairing from the inside the reinforcements added cannot be pre-stressed. When the pipe is brought under pressure these reinforcements undergo a certain elastic deformation (increase in their diameter) which causes cracking of the concrete of the core of the pipe. The concrete breaks in traction for a very small deformation, no material having the capacity to carry the significant stress for such extension. The cracking of the concrete causes two disadvantages. It worsens the flexural strength of the pipe and hence its capacity to resist dissymmetrical thrusts of the earth. It also allows corrosion to progress from the outside environment to the inside of the pipe. It also allows corrosion to progress from the exterior to the interior of the pipe. This risks causing early corrosion of the new reinforcement if it is metal. This problem often leads to the solutions for repairs from the inside with a basis of metal liners to be dismissed.

It is an object of the present invention to propose a perfected method of carrying out repairs from the inside.

SUMMARY OF THE INVENTION

Briefly, the present invention comprises a method of reinforcing an embedded cylindrical pipe, wherein a composite structural reinforcement is applied through in situ stratification of at least one band of reinforcement fibers and a resin matrix, the band being arranged according to a substantially helicoidal path along the internal side of the pipe.

When the pipe is brought back into service the pressure of the liquid tightens the fibers of the band which, if it has appropriate dimensions, will be able to carry most of the radial stress. The composite structure avoids the risks of corrosion encountered with solutions using metal liners. The helicoidal layout allows the in situ stratification in situ of the composite to be carried out which facilitates implementation and avoids the problems of watertight connection, the band covering itself with each turn.

The band can be mainly composed in particular of carbon fibers with well-established qualities as reinforcement fibers.

The pipes in question generally comprise a concrete core incorporating a metal liner, possibly with one or several pre-stressing threads wound around the concrete core and encased by a protective mortar.

The porosity of the composite reinforcement, even if it is very well realized, is low but remains relatively high in comparison with that of metal liners. In order to avoid the resulting disadvantages one possibility is to withdraw the concrete of the core located on the internal side of the liner in a repair section to adhere the composite structural reinforcement directly to the liner. The interstitial spaces between the liner and the composite reinforcement are thus avoided, the same being are likely to be penetrated by water if the composite reinforcement is not perfectly watertight. A situation should in fact be avoided wherein the water comes into contact with the liner by connecting the latter to the internal pressure of the pipe because this would render inefficient the new resistant covering having the role of taking this pressure to relieve the embrittled structure previously put in place.

In a further embodiment the composite structural reinforcement is adhered to the concrete of the core located on the internal side of the liner in the repair section. This simplifies implementation by avoiding the need to withdraw the concrete of the internal side over a great length. If defects in watertightness of the composite reinforcement are feared an advantageous embodiment consists in piercing drainage holes through the liner in the repair section before placing the composite structural reinforcement. These drainage holes cannot run from the concrete core and this limits contamination of the liner through external agents. If a small quantity of water manages to infiltrate through the composite reinforcement it is drained outside of the liner in such a way that the latter is not brought under pressure. In order to bring about watertightness at the ends of the repair section the concrete of the core situated on the internal side of the liner is withdrawn locally here and the composite structural reinforcement is adhered directly to the liner. The ends of the repair section are aligned preferably with joints between consecutive cylindrical sections assembled to form the pipe.

In an advantageous embodiment, holes are pierced in the core of the pipe which cross the liner and extend in the concrete of the core situated on the external side of the liner and armatures are sealed in said holes before placing the composite structural reinforcement. These armatures connect the new cutting reinforcement to the core of the pipe through the liner and thus provide resistance to the negative moments generated in the pipe when it is brought back under pressure. This results in the cracking process of the concrete being controlled, avoiding wide cracks which would allow aggressive external agents to penetrate as far as the liner.

An advantageous embodiment consists in arranging a layer of compressible material between the internal side of the pipe and the composite structural reinforcement. This material, for example a foam or felt, absorbs in crushing the deformations of the reinforcement due to the extension of the fibers of the band when the pipe is brought under pressure. It thus avoids connecting the service pressure to the liner.

A further aspect of the present invention is connected to underground works, including a reinforced cylindrical pipe in carrying out a method as described above.

BRIEF DESCRIPTION OF THE DRAWING

In the detailed description which follows, reference will be made to the drawing comprised of the following figures.

DESCRIPTION OF THE PREFERRED EMBODIMENT

Figure 2:
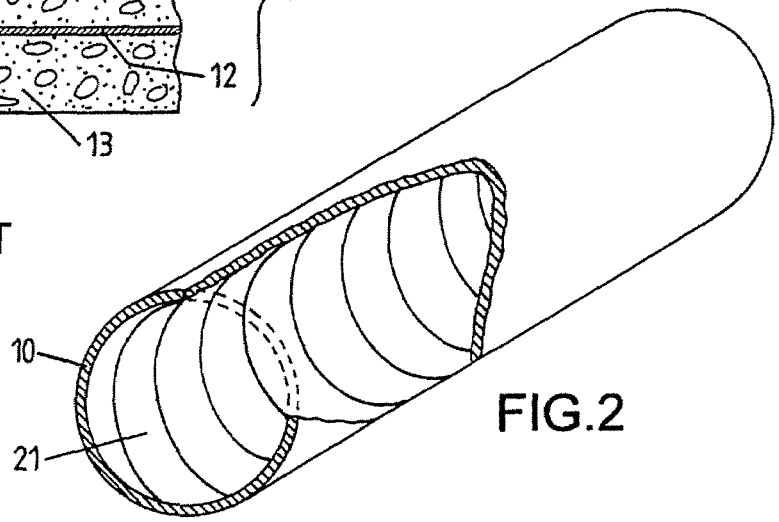
FIG. 2 is a perspective view of a pipe repaired according to the invention.

Referring to the figures, a composite reinforcement 20 is arranged inside a damaged underground pipe. This reinforcement is composed of a band of fibers 21 wound according to a helicoidal path along the internal side of the pipe, as illustrated by FIG. 2 (in which the ground material surrounding the pipe is not shown).

Figure 1:
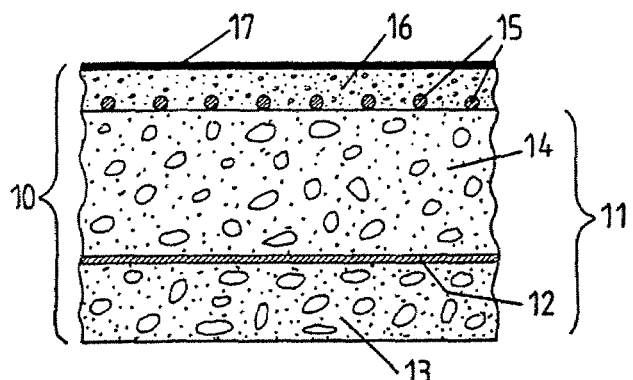
FIG. 1 is a previously described, is a sectional view of the wall of a pipe to which the invention can apply.

The pipes in question are preferably embedded cylinder pipes as described previously with reference to FIG. 1. Their diameter is sufficient to allow the intervention of a human operator inside, for example 1.5 to 4.5 m. The service pressure in the pipe can be up to around 0.5 MPa.

The reinforcement fibers of the band 21 are made from a resistant material (resistance to breaking typically greater than 1500 MPa) and are of a high elastic module (typically between 100 and 400 GPa). Carbon fibers will generally be used for this (resistance to breaking in the range of 3000 MPa). By way of example the bands 21 have a width of 600 mm and they are composed of carbon fibers oriented in the sense of a chain with a small proportion of glass fibers arranged in the sense of a frame in order to obtain a coherent tissue.

The composite reinforcement 20 is placed in the following way during repair works carried out on a section of the pipe after emptying:

if necessary, the internal side of the repair section is prepared mechanically and/or chemically (cleaning, sanding, degreasing, . . . );

this side is coated with a thin film of resin in the liquid state;

the band of carbon fibers 21 is applied, possibly pre-impregnated with resin, to the resin film still in liquid state, causing it to follow its helicoidal path along the internal side of the pipe. By way of example it can be provided that the advancing of the band over a winding turn corresponds to around half the width of the band and this ensures two thicknesses of fibers on the surface of the pipe;

this band is processed in order to cause it to penetrate into the resin and impregnate it totally;

and the resin is polymerized.

The resin used can have an epoxide base. The resin can be heatset and provided to polymerize at ambient temperature. It is for example an epoxy resin, bi-components of the type mentioned EP-A-0 799 951.

Figure 3:
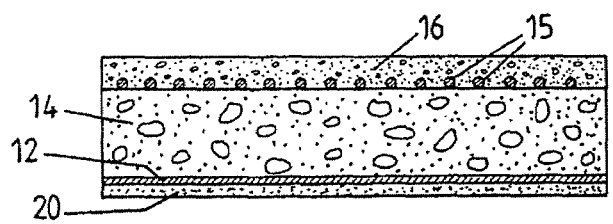
FIGS. 3 to 5 are sectional views of walls of pipes repaired according to several embodiments of the invention.

In the embodiment shown in FIG. 3 the preliminary preparation stage of the internal surface of the pipe includes the removal of the internal layer of concrete 13 in the repair section. This exposes the liner 12 to which the composite reinforcement 20 is directly applied. The interstices between the composite reinforcement 20 and the liner 12 are eliminated by reason of the very good adherence of the composite to steel.

Figure 4:
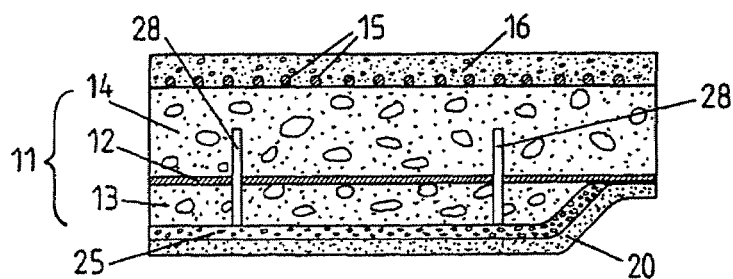

In the embodiment shown in FIG. 4 the internal layer of concrete 13 is maintained in the repair section except at its ends where the liner 12 is exposed. The band of fibers 21 is placed according to the helicoidal path between the two ends of the section. Before placing it a layer 25 of material which can be deformed under compression is installed on the internal side of the pipe. This layer 25 is realized for example in a polyurethane foam or felt over a thickness of one to a few centimeters. Its role is to absorb the dilatation of the reinforcement which is produced through extension of the carbon fibers when the pipe is brought under pressure in avoiding this pressure being transmitted to the core 11 of the pipe. The problems of cracking of the concrete can thus be eliminated.

At the ends of the repair section the deformable layer 25 is interrupted so that the composite reinforcement 20 adheres directly to the liner 12. This closes in a watertight way the volume occupied by the residual layer of concrete 13 and the deformable layer 25 and thus avoids the internal pressure establishing itself in this volume. Sufficient watertightness will typically be obtained with an adhered reinforcement/liner interface extending over a length of a few centimeters. As shown in FIG. 4 the interruption area of the concrete layer 13 can be managed so as to give it a beveled profile (for example over a length of one to twenty or thirty centimeters according to the thickness of the layer 13) in order that the reinforcement changes its degree of softness.

The ends of the repair section where the new reinforcement 20 adheres directly to the liner 12 are advantageously provided to the right of the joints between the consecutive segments of pipe which are generally spigot joints. Owing to the good adherence of the composite to steel this arrangement ensures good protection in the proximity of the joints where corrosion is often more likely to establish itself than in the area of the segments.

The non-zero porosity of the composite reinforcement can possibly allow water to infiltrate in the volume taken up by the residual layer of concrete 13 and the deformable layer 25 but in very small quantities if the reinforcement is carefully applied. In order to evacuate this water towards the exterior before the pressure can establish itself in this volume a judicious arrangement consists in realizing drains through the old liner 12. These drains consist of holes 28 pierced in the concrete of the core 11 before applying the reinforcement 20. The holes 28 cross the layers 13 and 12 and extend over a certain depth in the layer of concrete 14. It is preferable not to cause them to run from this layer 13 in order to avoid sectioning the pre-stressing threads 15 with the piercing tool. The drains are realized for example with a hole 28 every 1 or 2 m$^2$. The micro-cracking of the concrete of the layer 14 allows the infiltrated water to be evacuated to the exterior beyond the drains 28.

Figure 5:
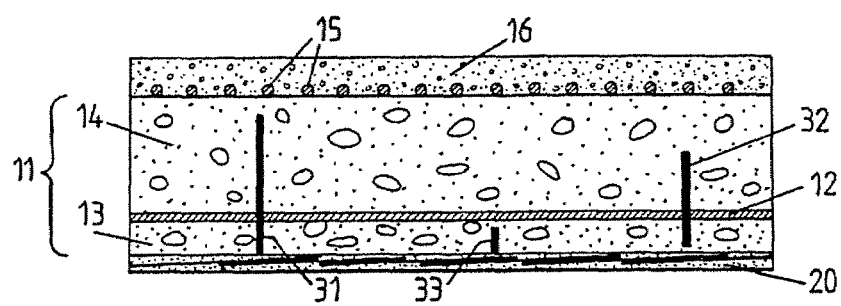

In the embodiment shown in FIG. 5, there is no attempt to prevent the cracking of the concrete when the pipe is brought under pressure. The composite reinforcement 20 is adhered directly to the layer of concrete 13. In order to control the cracking which occurs by reason of the extension of the bands of fibers a cutting connection with the concrete core is realized through the liner 12. This connection can be realized with the aid of armatures in the form of bars extending radially in the concrete core 11 and arranged at regular intervals on the repaired surface. Before applying the reinforcement 20 holes are pierced in the core of the pipe and armatures 31-33 are engaged. The armatures 31-33 are sealed in the holes, for example with the aid of the same resin as that used to constitute the matrix of the reinforcement 20.

These armatures 31, 33 can consist of carbon fiber core drivers coated with adherence resin and threaded in the holes. Their overshooting ends are spread in a fan over the surface before being covered by the reinforcement (see EP-A-0 837 201) in order to connect the concrete core 11 to the composite reinforcement 20 and to the metal liner 12. Some of these armatures (33 in FIG. 5) can remain confined to the superficial concrete layer 13 in order to connect it to the composite reinforcement 20.

In an alternative embodiment the armatures 32 consist of steel bars driven into the previously pierced holes. These bars allow the concrete core 11 to be connected to the liner 12.

What is claimed is:

1. A method of reinforcing an embedded cylindrical pipe, comprising the step of applying a composite structural reinforcement within the pipe through in situ stratification of at least one band of reinforcement fibers and a resin matrix, the band being arranged according to a substantially helicoidal path along an internal side of the pipe.

2. The method of claim 1, wherein the band is composed principally of carbon fibers.

3. The method of claim 1, wherein the pipe includes a concrete core having a metal liner incorporated therein further comprising the step of removing the concrete of the core situated on an internal side of the liner in a repair section of the pipe, and wherein the composite structural reinforcement is adhered directly to the liner.

4. The method of claim 1, wherein the pipe includes a concrete core having a metal liner incorporated therein wherein the composite structural reinforcement is adhered to the concrete of the core situated on an internal side of the liner in a repair section of the pipe.

5. The method of claim 4, further comprising the step of piercing drainage holes through the liner in the repair section before placing the composite structural reinforcement.

6. The method of claim 5, wherein the drainage holes do not exit from the concrete core.

7. The method of claim 4, further comprising the step of removing the concrete of the core situated on an internal side of the liner at ends of the repair section, and wherein the composite structural reinforcement is adhered directly to the liner at the ends of the repair section.

8. The method of claim 7, wherein the ends of the repair section are aligned with joints between consecutive cylindrical sections assembled to form the pipe.

9. The method of claim 1, wherein the pipe includes a concrete core having a metal liner incorporated therein further comprising the steps of piercing holes in the core of the pipe, said holes crossing the liner and extending in the concrete of the core situated on an external side of the liner, and sealing armatures in said holes before placing the composite structural reinforcement.

10. The method of claim 1, further comprising the step of arranging a layer of compressible material between an internal side of the pipe and the composite structural reinforcement.

11. An underground work comprising a buried cylindrical pipe, wherein the pipe is reinforced by a composite structural reinforcement applied within the pipe through in situ stratification of at least one band of reinforcement fibers and a resin matrix, and wherein the band is arranged according to a substantially helicoidal path along an internal side of the pipe.

12. The underground work of claim 11, wherein the band is composed principally of carbon fibers.

13. The underground work of claim 11, wherein the pipe includes a concrete core having a metal liner incorporated therein.

14. The underground work of claim 13, wherein the pipe further includes at least one pre-stressing thread wound around the concrete core and coated with a protective mortar.

15. The underground work of claim 13, wherein, in a repair section of the pipe, the composite structural reinforcement is adhered directly to the liner.

16. The underground work of claim 13, wherein the composite structural reinforcement is adhered to the concrete of the core situated on an internal side of the liner in a repair section of the pipe.

17. The underground work of claim 16, wherein the liner has drainage holes pierced therethrough in the repair section.

18. The underground work of claim 17, wherein the drainage holes do not exit from the concrete core.

19. The underground work of claim 16, wherein the composite structural reinforcement is adhered directly to the liner at the ends of the repair section.

20. The underground work of claim 19, wherein the ends of the repair section are aligned with joints between consecutive cylindrical sections assembled to form the pipe.

21. The underground work of claim 11, further comprising a layer of compressible material arranged between an internal side of the pipe and the composite structural reinforcement.

* * * * *